June 16, 1959  G. L. HELLER  2,890,839
CARBON BLACK
Filed May 24, 1956
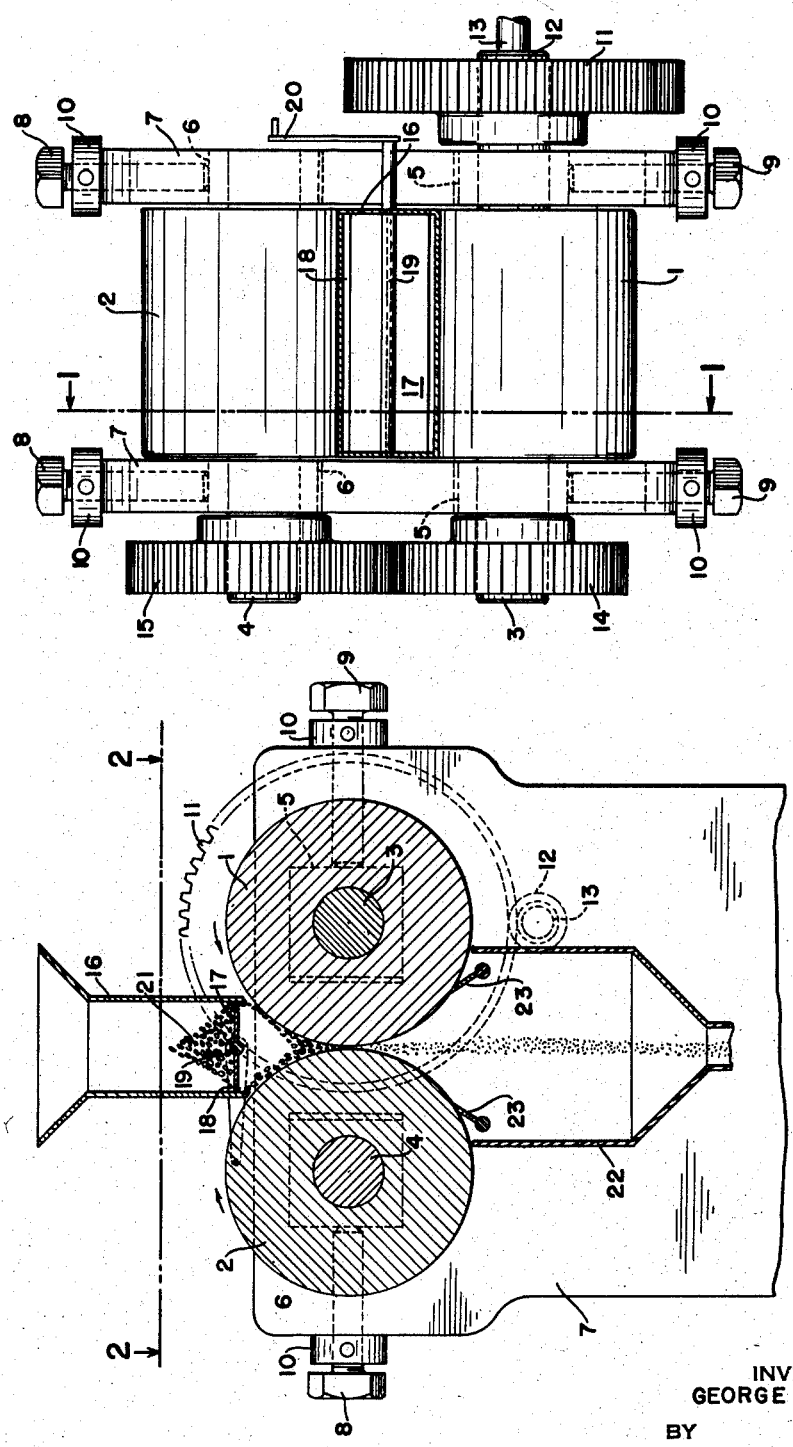
INVENTOR
GEORGE L. HELLER
BY
Pennie, Edmonds, Morton, Barrows & Taylor
ATTORNEYS

United States Patent Office 2,890,839
Patented June 16, 1959

---

2,890,839

CARBON BLACK

George L. Heller, Monroe, La., assignor to Columbian Carbon Company, New York, N.Y., a corporation of Delaware Application May 24, 1956, Serial No. 586,972

5 Claims. (Cl. 241—3)

This invention relates to a novel and highly effective method of treating carbon black whereby its physical properties and rubber compounding characteristics are drastically changed.

It has long been recognized that carbon blacks, and especially furnace blacks, vary greatly as to their particular characteristics and combinations of characteristics. These characteristics depend primarily upon the method, operating conditions and the raw material used in their manufacture.

It is also recognized that the properties of compositions of rubber compounded with carbon black are greatly influenced by the characteristics of the carbon black used.

The furnace blacks, extensively used in rubber compounding, are usually produced by thermally decomposing a hydrocarbon in a furnace chamber to form finely divided carbon black in gaseous suspension, the furnace gases with the carbon black particles suspended therein being passed from the furnace chamber and the carbon separated therefrom and collected.

Various types of hydrocarbon have been decomposed in operations of this type for the production of carbon black. Formerly, natural gas consisting principally of methane was generally used for making carbon blacks. More recently, normally liquid hydrocarbons and heavy residues of a highly aromatic nature, obtained from the cracking of petroleum for producing motor fuels, have been widely used.

The use of these heavy aromatic residues has the advantage of relatively high yields of carbon black and also lower costs per gallon of oil consumed.

The carbon blacks produced from these heavy aromatic residue oils are consistently characterized by relatively high "structure." "Structure," in relation to carbon black, is defined as a linking together of the carbon particles to form reticulate chains or clusters which persist in the rubber compound even after severe mixing. The extent of this linking or "structure" characteristic is readily seen in electron microscope photographs of carbon black.

The use of the electron microscope is limited for the everyday control testing necessary in carbon black manufacture. A more readily determined parameter of "structure" is "structure index." The "structure index" of a carbon black is derived from a correlation of oil absorption characteristics and particle size, as determined by the color test. The details of these tests are given in a paper, The Carbon Spectrum for the Rubber Compounder, published in Rubber Age, vol. 55, page 469, August 1944.

The concept of "structure index" is based on a normal structure carbon having an index number arbitrarily set at 100. An index higher than 100, indicates relatively high "structure"; while an index number below 100, indicates low "structure." In general, carbon blacks produced from natural gas have normal "structure" and carbon blacks produced from heavy aromatic oils have high "structure." This statement is particularly true for the finer carbon blacks used as rubber reinforcement pigments.

In rubber reinforcement, carbon black particle size is considered the most important characteristic—the smaller the carbon black particles, the greater the rubber reinforcement properties.

As far as synthetic rubber is concerned, carbon black "structure" acts as a booster to complement particle size, imparting better wear characteristics—characterized by high modulus and high tensile strength. However, a point is reached where the "structure" becomes too high for the particle size, resulting in rubber processing difficulties, such as rubber scorching in the Banbury mixer. As a general rule the "structure" level of the commercial carbon blacks produced from aromatic oils are considered good for synthetic rubbers.

However, in natural rubber, high structure has the tendency to lower somewhat tensile strength and to cause excessive rubber scorching in mixing. For this reason normal structure carbon blacks are considered better for natural rubber. When it is realized that natural rubber still comprises ⅔ of the world's supply of rubber, the importance of producing normal "structure" carbon blacks can readily be seen.

Although the high molecular weight liquid aromatic hydrocarbons produce carbon blacks of high "structure," which are not preferred for natural rubber, they have definite advantages in yield and production rate over the raw materials, natural gas and paraffinic oils, used to produce normal "structure" carbon blacks.

Therefore, it can be seen that the dilemma of the carbon black industry is to take advantage of the high yields and production rates of the aromatic oils and at the same time be able to produce a high "structure" carbon black for synthetic rubber and a normal "structure" carbon black for natural rubber.

Some control over "structure" can be exercised by controlling furnace operating conditions, but such control has definite and serious limitations and usually results in a loss in yield.

It has been proposed to reduce the structure of these so-called high structure blacks by subjecting them to ball milling. Though effective in reducing structure, the ball mill treatment is impractical in commercial operations for the reasons that it is essentially a batch operation and is exceedingly slow in effecting the desired results. Also, there is no practical control of the extent or severity of the treatment of any particular cluster of particles of the carbon black. Further, the black becomes contaminated with foreign particles eroded from the surfaces of the mill, the presence of which is highly objectionable in the black.

I have discovered that the reduction in structure accomplished by a prolonged ball milling of such high structure blacks can be accomplished continuously, and almost instantly, and that the reduction in structure of the carbon black may be effected, far more uniformly than that effected by the previous ball milling operations, by subjecting the black to extremely high pressure detrition resulting from passing the black as a continuous, uniform stream between two hard-surfaced rolls set to a clearance not execeeding 0.030 inch and rotating at different circumferential speeds. The ratio of surface speeds of the rollers, though subject to some variation, should be about 1:1.25 and the peripheral speed of the rollers must not be so high as to set up a boiling action in the black causing it to escape being uniformly gripped in the bite between the rollers.

The optimum roller speed will depend somewhat upon the diameters of the rolls and the density of the black being fed thereto. In general, this peripheral speed must not exceed 150 ft./min. Usually, best results are obtained where the peripheral speed does not exceed about 140 ft./min. Lower peripheral speeds may be used, if desired.

A primary consideration in determining roll speed is the feed rate of the black. It is usually desirable to maintain feed rate at a maximum, consistent with the required extent of detrition, which is the primary consideration in selecting the particular roll clearance.

The black passed to the rolls may be either beaded or unbeaded but in any case should be predensed to a bulk density of at least 15 pounds per cubic foot. In addition to compressing and grinding the black, the surfaces of the rolls above the bite serve further to dense the black to a state in which it is readily gripped by the bite of the rolls.

These carbon blacks as initially produced are fine, fluffy powders of low bulk density which readily fly into the atmosphere and will not pass readily or uniformly into the extremely small clearances between the rolls required in accordance with the present invention. For this reason, it is necessary that the black be predensed, as previously noted, to a density not less than 15 pounds per cubic foot and more advantageously within the range of 16-24 pounds per cubic foot. It is preferred that the carbon black be beaded before being passed to the roll mill but this is not necessary providing the predensed requirement is met.

The necessary predensing of the black may be effected by any conventional method. For instance, by vigorous agitation or applying pressure thereto. Or the black may be predensed by beading of the black by the dry-beading process or the wet-beading process, both of which are generally known to the industry and need not here be further described. An alternative predensing method is to pass the fluffy black, as initially produced, between rotating steel rolls spaced apart about 1 mm.

Such predensing of high structured blacks causes some apparent reduction in structure in that it destroys, to a greater or less extent, what is known as false or temporary structure. The structure characteristic with which we are here concerned is the persistent or permanent type of structure which is not destroyed or altered by the densing methods just noted. The work done on the blacks in accordance with my present invention is of a very much higher order than that involved in the densing of the black. Other conditions being equal, the severity of the treatment, and consequently the extent of structure destruction, is dependent on the clearance between the rolls, which can be readily varied at the will of the operator but must not exceed 0.03 inch.

In order to obtain optimum results, it is necessary that the black be passed through the bite between the rolls at a uniform rate over the entire length of the bite so that the layer of black passing through the bite is of uniform thickness. Otherwise, the treatment will lack uniformity of severity and a uniform product is not obtained. Where desired the carbon black may be passed repeatedly between the rolls so as progressively to decrease its structure characteristics. By this procedure results may be obtained with the rolls set to a clearance toward the upper limit of the prescribed range comparable with those obtained using a smaller clearance. However, permanent structure is not materially altered, even by repeated passes through the bite, if this clearance exceeds 0.03 inch.

Using detrition apparatus, of the type subsequently described herein, operated in accordance with this invention, I can accomplish by passing the black but once between the rolls, set to a clearance of 0.030" to 0.015", a reduction in structure equal to that accomplished by ball milling for 24 hours.

Where this clearance is reduced to 0.015" to 0.005", in a single pass between the rolls, I can effect a reduction in structure equal to that accomplished by ball milling in 48 hours. Where the clearance is reduced to below 0.005", I can accomplish by a single pass of the black between the rolls a structure reduction equal to that which can be accomplished by ball milling, regardless of the duration of such milling.

It is advantageous to use for this purpose apparatus in which the desired clearance between the rolls can be maintained and nicely controlled and adjusted in increments of about 0.001" down to a minimum clearance, not exceeding 0.003".

The process of my invention will be further described and illustrated with reference to the accompanying drawings which represent apparatus which has been used with particular advantage in carrying out the process and of which Fig. 1 is a diagrammatic, conventional, vertical section, along the line 1—1 of Fig. 2, of a roll mill and various accessories thereto, and Fig. 2 is a plan view along the line 2—2 of Fig. 1.

The apparatus comprises two cooperating rolls 1 and 2 of equal diameters, rotatably supported at each end by shafts 3 and 4, respectively, mounted in journal blocks 5 and 6, all supported by side frames represented at 7.

The journal blocks are mounted in the side frames and are adapted to be moved horizontally by means of adjusment, fine threaded, screws 8 and 9, which are held in the desired adjusted position by means of lock nuts 10.

A gear 11 is secured to one end of shaft 3 and is adapted to cooperate with driving gear 12 secured to driving shaft 13 which is driven by any adequate source of power.

Gear 14 is secured to the opposite end of shaft 3 and is adapted to cooperate with gear 15 secured to the corresponding end of shaft 4. The tooth ratio of gears 14 and 15 is such that the peripheral speed of roll 1 is about 25% greater than that of roll 2.

It is an essential of the operation that the carbon black to be treated be fed into the bite between the rolls 1 and 2 continuously and uniformly throughout the length of the bite. It is also desirable that the surfaces of the rolls be of sufficient hardness to resist abrasion by the carbon black. To meet this latter requirement, the hardness of the surfaces of the rolls should be greater than 650 Brinnell hardness or in excess of 65 by the Scleroscope test. It is to be particularly recommended that the Scleroscope harness of the roll surface be within the range of 68-72.

It is also important that the side frames of the mill and the roll shafts and bearings and bearing adjustments be sufficiently rigid to withstand pressures of the order of 175,000 pounds per linear foot of roll length.

For effecting the uniform continuous feed of the carbon black to the bite between the rolls, I provide a chute 16 of a length equal to the length of the roll surface and of a somewhat smaller width. This chute is set just above the bite between the rolls and is provided at its lower end with a valve 17 commensurate in length with that of the chute and of a width slightly less than the width of the chute, so as to provide, along each side of the bottom of the chute, just above the roll surfaces, uniform openings 18 extending the length of the rolls. This valve 17 is supported by a longitudinal shaft 19 which in turn is supported by the ends of hopper 16 and is provided at one end with a lever 20 for adjusting the position of the valve.

The body of carbon black, indicated at 21, in the chute should be not so deep as to cause packing or bridging of the black, but should at all times be maintained, with due consideration of the angle of repose of the black, to extend over the entire length and width of the bottom of the chute so as to flow uniformly through the openings 18 and into the bite between the rolls over their entire length.

A receiving hopper 22, extending over the entire length of the rolls, is positioned beneath the bite to catch the carbon black passing therefrom. Where the black is of a type which tends to adhere to the rolls, scrapers of any convenient type, for instance as shown at 23, may be used to scrape the black from the roll surface.

The optimum rate at which the black is fed to the roll mill from hopper 16 may be controlled and regulated by operation of the valve 17 and the optimum rate will depend primarily upon the density and type of black being treated and the clearance between the rolls. The optimum clearance will depend primarily upon the required extent of structure reduction.

It will be appreciated that under the terrific stresses imposed upon the mill during operation, there is a tendency to break down the lubricant films within the journal blocks 6 and 7 and thus increase the gap between the rolls. Under such severe loading conditions it may be necessary, from time to time during the operation, to adjust the roll spacing, by means of adjustment screws 8 and 9, in order to maintain the desired spacing between the rolls uniform throughout their length.

The throughput will depend primarily upon the clearance between the rolls, as previously noted, but will also vary somewhat with the density and type of black being treated and with the diameter of the rolls. It will also depend upon the linear peripheral velocity of the slower moving roll. Generally, I have found that at a linear velocity of 100 feet per minute, for instance, feed rates per 6 inches of roll width of the indicated clearances may be estimated as follows:

| Clearance Between Rolls | Feed Rate, pounds per min. |
|---|---|
| 0.003 inch | ½ |
| 0.006 inch | 1 |
| 0.013 inch | 2 |
| 0.017 inch | 3 |
| 0.021 inch | 4 |
| 0.025 inch | 5 |

Using rolls of 14¾ inch diameter and 6 inches in length, the slower roll operating at 29 r.p.m. and the faster roll at 36 r.p.m., I have been able to process 10 pounds of carbon black per minute with the rolls set to a clearance of 0.013 inch, and with the rolls set to a clearance of 0.025 inch, I have been able to process the black at the rate of 25 pounds per minute.

On a somewhat smaller mill, comprising 6-inch diameter rolls of 12-inch length, operating respectively at 24 and 30 r.p.m., I have satisfactorily maintained feed rates set forth in the following table at the indicated clearances:

| Clearance Between Rolls | Feed Rate, pounds per min. |
|---|---|
| 0.003 inch | 2 |
| 0.009 inch | 5 |
| 0.026 inch | 10 |

The invention, and the effectiveness thereof in altering the physical properties and rubber compounding characteristics of various types of carbon black are further illustrated by the following specific examples, in which the indicated types of carbon black were treated in accordance with this invention on apparatus substantially as represented by the drawing. In each instance, samples of the black prior to treatment and following one or more stages of treatment were tested by identical, conventional test procedures, compounded with rubber and the resultant rubber compositions cured and tested by comparable methods, and the results thereof are set forth in the respective tabulations.

*Example I*

In this operation, a high structure furnace black of the HAF type was converted to a VFF type black by subjecting it to detrition of the type described with the roll clearance set to .003 inch. The physical and rubber compounding characteristics of the black prior to and following the treatment were as follows:

|  | Untreated Black | After One Pass | After Ten Passes |
|---|---|---|---|
| ABC Color Value | 125 | 138 | 138 |
| Oil Absorption—Gals./100 lbs | 15.4 | 11.6 | 10.3 |
| Structure Index | 161 | 112 | 98 |
| Modulus: |  |  |  |
| L-300 | 1,775 | 1,300 | 1,160 |
| L-400 | 2,685 | 2,135 | 2,000 |
| Tensile Strength | 4,100 | 4,375 | 4,350 |
| Elongation | 560 | 640 | 630 |
| Hardness | 68 | 63 | 61 |
| Log R | 2.1 | 3.5 | 3.9 |
| Rebound | 78.7 | 81.1 | 81.8 |

*Example II*

In this operation, a high structure furnace black of the ISAF type was converted to a channel-type black by subjecting it to detrition of the type described with the roll clearance set to .003 inch. The physical and rubber compounding characteristics of the black prior to and following the treatment were as follows:

|  | Untreated Black | Two Passes |
|---|---|---|
| ABC Color Value | 140 | 148 |
| Oil Absorption—Gals./100 lbs | 16.9 | 12.8 |
| Structure Index | 161 | 114 |
| Modulus: |  |  |
| L-300 | 2,060 | 1,190 |
| L-500 | 3,710 | 2,890 |
| Tensile Strength | 4,225 | 4,125 |
| Elongation | 576 | 665 |
| Log R | 2.1 | 2.1 |

*Example III*

In this operation, a high structure furnace black of the FEF type was converted to an FF type black by subjecting it to detrition of the type described with the roll clearance set to .004 inch. The physical and rubber compounding characteristics of the black prior to and following the treatment were as follows:

|  | Untreated Black | After Two Passes | After Four Passes |
|---|---|---|---|
| ABC Color Value | 96 | 113 | 115 |
| Oil Absorption—Gals./100 lbs | 16.2 | 11.5 | 10.7 |
| Structure Index | 187 | 126 | 118 |
| Modulus: L-400 | 2,800 | 2,300 | 2,290 |
| Tensile Strength | 3,900 | 4,125 | 4,300 |
| Elongation | 502 | 590 | 610 |
| Rebound | 83.0 | 84.2 | 84.2 |
| Log R | 5.2 | 7.8 | 8.2 |
| Blow-out (minutes) | 18N | 23 | 22 |

I claim:

1. A continuous process for breaking down the reticulate chain structure of high structure carbon blacks which comprises subjecting the black to detrition by passing it in a substantially dry form and at an initial bulk density within the range of 15 to 24 lbs./cu. ft. as a continuous, thin uniform stream between the peripheral surfaces of hard non-yielding counterrotating rolls spaced apart a distance not exceeding 0.030 inch and rotating at a maximum peripheral speed not exceeding 150 ft./min., the peripheral speed of one roll exceeding that of the other by about 25%.

2. The process of claim 1 in which the black is passed between rolls set to a clearance not exceeding 0.01 inch.

3. The process of claim 2 in which the clearance between the rolls does not exceed 0.005 inch.

4. The process of claim 1 in which the black so treated has been predensed to a density within the range of 16–24 pounds per cubic foot.

5. The process of claim 4 in which the predensed black is caused to flow freely by gravity to the bite between the roll.

References Cited in the file of this patent

UNITED STATES PATENTS

| | | |
|---|---|---|
| 2,066,274 | Grote | Dec. 29, 1936 |
| 2,415,355 | Kaufmann et al. | Feb. 4, 1947 |
| 2,502,106 | Skoog et al. | Mar. 28, 1950 |
| 2,663,907 | Downing et al. | Dec. 29, 1953 |

FOREIGN PATENTS

| | | |
|---|---|---|
| 393,351 | Great Britain | June 8, 1933 |

UNITED STATES PATENT OFFICE
CERTIFICATE OF CORRECTION

Patent No. 2,890,839                                                                     June 16, 1959

George L. Heller

It is hereby certified that error appears in the printed specification of the above numbered patent requiring correction and that the said Letters Patent should read as corrected below.

Column 6, line 40, Example II, in the table, second column thereof, under the heading "Untreated Black", opposite "Elongation----" for "576" read -- 575 --; line 58, Example III, in the table, second column thereof, under the heading "Untreated Black", opposite "Elongation----" for "502" read -- 520 --; same table and column, line 61, opposite "Blow-out (minutes)----" for "18N" read -- 18-1/4 --; fourth column, same line 61, under the heading "After Four Passes", for "22" read -- 24 --.

Signed and sealed this 27th day of October 1959.

(SEAL)
Attest:

KARL H. AXLINE
Attesting Officer

ROBERT C. WATSON
Commissioner of Patents